United States Patent Office 2,959,517
Patented Nov. 8, 1960

---

2,959,517

BIS(TRICHLOROMETHYL)SULFONE AS A BIOCIDE

James B. Bowers, Los Altos, and Robert B. Langford, Los Angeles, Calif., assignors to Stauffer Chemical Company, a corporation of Delaware No Drawing. Filed Oct. 13, 1958, Ser. No. 766,683

1 Claim. (Cl. 167—22)

This invention relates to a microbiocide and to a method of killing bacteria and fungus.

It is known that bis(trichloromethyl)sulfone is an insecticide. It has now been found that this compound is an active microbiocide and is particularly effective against bacteria. Additionally, it has been noted that its activity against fungi is of high order.

This material may be prepared by reacting thiobisacetic acid with an excess of sodium hypochlorite solution and allowing the desired compound to precipitate out of the solution or, alternatively, by the method set out in the James patent, 2,628,982.

Bis(trichloromethyl)sulfone, hereinafter designated T-2100, has been tested against a wide variety of bacteria and found especially effective. Where it was used against *Staph. aureus*, *Erwinia amylovora* and *Escherishia coli* in concentrations of 5 parts per million, no growth of the bacteria was noted.

Additional tests were conducted wherein T-2100 was found to be especially effective against other strains of fungi. Fungi are tested in vitro starting with one ounce bottles partially filled with a malt broth. These bottles and broth in them are sterilized. The compound or material to be tested is mixed with the malt broth at 500, 100, 10 or any desired concentration (expressed in parts per million) and the bottles are inoculated with a spore suspension of the desired fungus. The bottles are then sealed and held for one week after which the tests are examined. The lowest concentration which prevents growth is usually taken as a definitive concentration.

Tests of fungicidal activity on plant foliage are conducted to show the protectant activity of the compound. Plants are sprayed with known concentrations of the compound, allowed to dry, and inoculated with a spore suspension of the desired fungus. Plants are then held under conditions favorable for infection and development of each disease. After a suitable time, the plants are inspected and control is rated, expressing the amount of disease as a percentage of that on unprotected plants.

The fungus fumigation test is conducted by placing a microbeaker containing a sample of the compound in the center of a sterile petri dish containing an agar medium suitable for growing fungi. The agar plate is then inoculated and the fungi will grow around the microbeaker and as close to it as the volatility and effectiveness of the compound permit. Effectiveness is expressed as the percent of the plate that is kept free of fungus growth.

A soil mix test is conducted by mixing a compound to give known concentrations in soil naturally infected with fungi or other microorganisms. In the present case, organisms affecting beans were present and the treatments were evaluated by planting bean seeds in the treated soil and comparing the resultant growth and infection to that of beans in untreated soil.

Results are set forth in Table A below.

*Table A*

| Test | T-2100 |
|---|---|
| *Aspergillus niger*,[a] | p.p.m.-- 10 |
| *Sclerotinia fructicola*[a] | p.p.m.-- 5 |
| *Stemphyllium sp.*[a] | p.p.m.-- 5 |
| Bean rust, 1,000 p.p.m., percent control (approx.) | [b] 87 |
| Bean mildew, 1,000 p.p.m., percent control (approx.) | [b] 35 |
| Fungus fumigation test, percent control | 100 |
| Soil mix fungus test, percent control at: | |
| 110 p.p.m. | Ph |
| 55 p.p.m. | 25 |

[a] = Lowest effective concentration.
[b] = Light phytotoxicity.
Ph = Phytotoxicity effect of residues in soil.

A preferred manner of using T-2100 is to incorporate it in soap since T-2100 is effective in very small amounts and is economically and conveniently applied with a carrier therefor.

Specifically, compounds were made up as 1% solutions in a mixture of acetone and soap solution. The final mixture was 1% compound, 5% soap, 47% acetone, and 47% water. Small aliquots of this mixture were applied to 14 mm. diameter filter paper disks. The disks were then placed on the surface of Difco nutrient agar plates which had been uniformly seeded with a culture of *Micrococcus pyogenes* variety *aureus*. Compounds diffusing from the paper disc into the agar inhibited bacterial growth in a zone around the disc. The diameter of the zone of inhibition was proportional to the bactericidal activity of the compound. The following results were obtained when comparing T-2100 with tetramethyl thiuram disulfide (TMTD), a commonly used commercial material:

| Compound | Width of Inhibition Zone (mm.)— Solution | | | |
|---|---|---|---|---|
| | .04 ml. | .02 ml. | .01 ml. | .005 ml. |
| T-2100 mm.. | over 50 | over 50 | over 50 | over 50 |
| TMTD mm.. | 17 | 17 | 14 | 10 |

NOTE.—50 mm. zone would reach the edge of the petri dish and would be the largest possible zone.

Other carriers are suitable. T-2100 has a melting point of about 35–40° C. and readily dissolves in a wide variety of organic solvents, as well as serving as a solvent for other organics, itself. It may be applied as a dispersion as well as in a solution.

As stated above, there are several methods for preparing this material, one of which is set out in the example below:

*Example.*—To an aqueous solution of thiobisacetic acid was added an excess of sodium hypochlorite solution. On standing, bis(trichloromethyl)sulfone precipitated. It melted at 37° C. on recrystallization from petroleum ether.

Obviously, many modifications and variations of this invention may be made without departing from the spirit and scope thereof and only such limitations should be imposed as are indicated in the appended claim.

We claim:
A method of inhibiting the growth of bacteria and fungi comprising applying thereto a small but effective amount of bis(trichloromethyl)sulfone.

References Cited in the file of this patent

UNITED STATES PATENTS

| | | |
|---|---|---|
| 1,986,218 | Remy | Jan. 1, 1935 |
| 2,045,925 | Remy | June 30, 1936 |
| 2,140,608 | Ufer | Dec. 20, 1938 |

FOREIGN PATENTS

| | | |
|---|---|---|
| 728,969 | Great Britain | Apr. 27, 1955 |

OTHER REFERENCES

Plant Disease Reporter, Supp. No. 182, March 30, 1949 pp. 89–109 (p. 104 relied upon).